(12) United States Patent
Fritzsche

(10) Patent No.: US 7,938,614 B2
(45) Date of Patent: May 10, 2011

(54) GRABBER FOR AUTOMATICALLY GRABBING PACKING UNITS

(75) Inventor: Roland Fritzsche, Nürnberg (DE)

(73) Assignee: Dematic Corp., Grand Rapids, MI (US)

( * ) Notice: Subject to any disclaimer, the term of this patent is extended or adjusted under 35 U.S.C. 154(b) by 322 days.

(21) Appl. No.: 12/237,780

(22) Filed: Sep. 25, 2008

(65) Prior Publication Data

US 2009/0087295 A1 Apr. 2, 2009

(30) Foreign Application Priority Data

Sep. 28, 2007 (DE) .......................... 10 2007 046 919

(51) Int. Cl.
*B65G 57/03* (2006.01)
*B65G 1/18* (2006.01)
*B66F 9/18* (2006.01)

(52) U.S. Cl. .................. 414/793.4; 414/799; 414/792.9; 414/622; 414/741; 901/34

(58) Field of Classification Search .................. 414/619, 414/621–623, 788, 790.2, 791.6, 792.7, 799, 414/661, 741; 901/34; 294/103.1, 119.1, 294/3
See application file for complete search history.

(56) References Cited

U.S. PATENT DOCUMENTS

| | | | | |
|---|---|---|---|---|
| 2,611,497 A | * | 9/1952 | Backofen | 414/622 |
| 3,414,138 A | * | 12/1968 | Junemann et al. | 414/793.8 |
| 4,274,780 A | | 6/1981 | Kaul et al. | |
| 4,533,167 A | * | 8/1985 | Johnson | 294/86.4 |
| 5,088,877 A | * | 2/1992 | Henk | 414/626 |
| 5,364,146 A | * | 11/1994 | Brandorff et al. | 294/86.4 |
| 6,579,053 B1 | * | 6/2003 | Grams et al. | 414/269 |
| 7,047,710 B2 | | 5/2006 | Winkler | |
| 2007/0154292 A1 | * | 7/2007 | Gammerler et al. | 414/286 |

FOREIGN PATENT DOCUMENTS

| | | |
|---|---|---|
| DE | 297 21 203 U1 | 3/1998 |
| EP | 0 007 119 B1 | 5/1979 |
| EP | 1 462 394 B1 | 8/2006 |

OTHER PUBLICATIONS

De-Z: Logistik im Unternehmen, (1999) Heft 4/5 vol. 13, S. 76 bis 78, Greifer der Fa. Ro-Ber Industrieroboter GmbH, Kamen.
Commonly assigned copending U.S. Appl. No. 12/294,495, filed Sep. 25, 2008, entitiled Process and Device for Multi-Layer Stacking on a Support, by Applicant Roland Fritzsche.

* cited by examiner

*Primary Examiner* — Gregory W Adams
(74) *Attorney, Agent, or Firm* — Van Dyke, Gardner, Linn & Burkhart, LLP

(57) ABSTRACT

A grabber for automatically grabbing and placing packing units of different dimensions and configurations includes a frame with a support, a hold-down device and a stripper attached to the frame. The support supports a bottom portion of a respective packing unit, and is generally horizontally movable with respect to the frame. The hold-down device is downwardly movable toward the support to clamp the respective packing unit between the support and the hold-down device. The stripper is disposed above the support and is generally horizontally movable. The respective packing unit is substantially immobilized by the hold-down device and the stripper as the support is retracted.

21 Claims, 4 Drawing Sheets

GRABBER FOR AUTOMATICALLY GRABBING PACKING UNITS

FIELD OF THE INVENTION

The present invention relates generally to grabbers for automatically grabbing and putting down packing units or objects of different dimensions and configurations, in particular in order to stack units upon a support with multiple layers in a predetermined 3-dimensional arrangement.

BACKGROUND OF THE INVENTION

The automatic stacking of units on a support, in particular a pallet or a rolling truck, with the packing units forming a stack, i.e. palletising, is known. However, such known palletising operations frequently use packing units of a uniform size or dimension and configuration which are typically lowered or placed or put down by robots, grabbers etc. in spaces determined by computer.

In contrast, the process of automatically loading a load carrier with packing units having different dimensions and configurations and materials, in order to form a stack, is known as automatic "mixed-case" palletising. In addition to having non-uniform dimensions, the packing units may also vary in configuration, i.e. they may include hard or soft packages, flexible packages, or packages having different shapes such as square, round or other non-uniform shapes etc.

In automatic mixed-case palletising, different aspects must be taken into consideration which drastically increase the complexity as compared to "simple" stacking, such as stacking packing units of uniform qualities as discussed above. For example, a subsequent packing unit can only be stacked or lowered or put down effectively onto a preceding packing unit if the preceding unit has a flat or planar upper surface, the two packing units are approximately horizontally aligned, and the preceding packing unit is able to support the weight of the subsequent packing unit placed upon it without being damaged.

The formed stack should also have a high degree of stability to promote, inter alia, a stack that is not prone to fall over during transportation. Although film wrapped around the stack does provide some assistance in this respect, it is generally insufficient to stabilise an otherwise incorrectly formed stack. A further consideration is that customers require, with increasing frequency, optimization of the stacks to facilitate a desired unloading sequence. Moreover, the wide diversity of physical characteristics among packing units combined with additional considerations such as those mentioned above have made it difficult to handle and/or grab such packing units automatically. Thus, packing units or goods of varying characteristics, such as different sizes and dimensions, are typically stacked by hand in light of stringent requirements for the stability of the stack, packing density within the stack, the sequence of loading and unloading, and the stacking-suitability of the goods. Further, known methods and devices have failed to meet these requirements.

Some previously known palletizing devices do not raise the packing units by means of a grabber, but rather displace them in one plane only. For example, devices for automatically loading a load carrier with packing units to form a load stack are known, such as the device of European Patent No. EP 1 462 394 B1. In such devices, the packing units are generally not lifted. For example, the packing units may be supplied seated on trays and lowered from the trays onto a packing table. The packing unit, whilst lying on the table, is displaced by a pusher along the broadside of a pallet waiting to be loaded, until the packing unit is moved to desired loading coordinates in an X-direction. Then, another pusher and a loading guide push or displace the packing unit over the pallet along the loading depth until the packing unit is moved to desired loading coordinates in a Z-direction. Then, the loading guide moves back, wherein the pusher remains stationary and serves as a stripper, so that the packing unit is set down on the pallet at the desired position. The resulting stack is supported by a loading aid on the remaining three sides. Stacking is thus performed quasi "against the wall".

Such known devices and methods only allow access to a pallet or a rolling truck from one side. Thus, any respective packing unit can only lower to a certain extent into a free space within any given sequence of packing units within a stack. Moreover, after each loading procedure, the pallet is adjusted in height to load the next free space, if the pallet is loaded by the "mixed-case" method, discussed above. Further, it is time-consuming to displace articles on a packing table using pushers and, combined with the limited free space and restricted accessibility, this has drawbacks when forming the packing pattern. It has also been found that such a device cannot be used for stacking all existing types of packing units.

A grabber used for the purpose of raising and moving a plurality of different packing units in order to perform a stacking procedure is also known, an example of which is available from the company Ro-Ber Industrieroboter GmbH, Kamen. As shown in Logistik im Unternehmen [*Business Logistics*], book 4/5, vol. 13 (1999), pages 76 to 78, the Ro-Ber grabber includes a support comb on which a packing unit is received, and a hold-down device, such as for mechanically clamping the packing unit at the top and bottom to permit safe transportation or movement of the packing unit. Furthermore, the packing unit is additionally fixed or immobilized from the side by a vacuum or suction device. In order to lower or set down the packing units, the mobile support comb is moved back and the packing unit set down, wherein it lies against a stationary stripper. However, the surface formed by the Ro-Ber support comb does not change in size, allowing packing units which are larger than the surface to protrude beyond same. In the event of low intrinsic stability or defective packaging of the packing units this can cause parts of the packing units to dangle or even to be lost. Potentially, this could lead to a crash or to incomplete order processing.

The sequence and selection of packing units to occupy the free space in a stack produces a stack having the desired characteristics, such as stability and packing density. Further, it provides the ability to handle various different packing units for creating such a stack using a single "universal" grabber.

SUMMARY OF THE INVENTION

The present invention provides a grabber for automatically grabbing packing units or load carriers or parcels or boxes of different dimensions and configurations, in order to stack a support or pallet with multiple layers in a predetermined 3-dimensional arrangement, and to provide a method for using the grabber for stacking purposes. The device and method of the present invention permits flexible mixed-case stacking of varied packing units with a high throughput using a single grabber. The grabber and the corresponding method permit satisfactory placement of the packing units on the support at a desired position in spite of different packing unit dimensions, materials or configurations.

In one aspect, the stripper is configured to be able to move horizontally in parallel with the support, thereby making it possible to position a respective packing unit at the ends of the support, either on or between the left-hand side and right-hand side, depending on the desired or predetermined position on the support. Since the hold-down device rests on the packing unit, such positioning prevents the packing unit from sliding or tilting when the support is retracted to release the packing unit. Therefore, positioning can be affected or performed in a particularly reliable and precise manner, and packing units of different dimensions and configurations can be grabbed and lowered reliably. Also, tests have shown that even packing units which have damaged packaging can be reliably grabbed and lowered.

In another aspect, the stripper and/or the hold-down device can be pre-positioned. Therefore, it is possible to achieve short grab times, since the packing units can be positioned on the front edge or end of the support irrespective of the dimensions or configurations or shapes of the packing units by positioning the stripper as a corresponding stop before the packing unit is picked up.

In yet another aspect, the support may be a support plate or support comb having several spaced apart tines. Using this configuration, is that it is possible to grab underneath the packing units, such as when they are being stored or delivered on roller conveyors and the tines can be driven between the rollers or protruding lifting plates.

In still another aspect, the hold-down device may be formed in the shape of a plate, so that it can press flatly onto the packing unit from above. In particular, the hold-down device may be dimensioned such that it extends over the entirety of a lower surface of the support. Using such a hold-down device, both small and bulky packing units, or other problematic goods such as toilet paper packages, can be held securely.

In another aspect, the stripper includes a horizontal wall which is provided with a rod-like structure. The hold-down device may then be provided with cut-outs to allow the stripper to pass through. Therefore, in spite of the substantial height extension of the stripper, the hold-down device can be easily moved extensively downwards toward the support, such as for relatively small packing units. The hold-down device may be provided with slot-like cut-outs to facilitate simultaneous positioning of the stripper.

The support, such as the tines of the support comb and/or the hold-down device, may be divided into one or more groups of individual tines or units whose interval spacing can be independently or mutually varied. When so divided, the width of the support comb or hold-down device can be adjusted in the manner of an adjustable rack, such as by adjusting the position of each tine or unit relative to the other tines or units. For example, wide interval spacing may be used for handling particularly broad packing units, or narrow spacing for particularly narrow packing units.

The hold-down device may have an elastic pad, such as a foam pad, positioned on the side of the hold-down device facing the support. Such a hold-down device facilitates grabbing of soft packing units.

At least one of the support comb, the hold-down device and the stripper may be displaceable via an electric motor or a pneumatic drive.

In another aspect, sensors may be provided for determining the hold-down force between the tines of the support comb and the hold-down device. Such sensors prevent damage, even to sensitive products, by the hold-down device while also ensuring secure handling by applying sufficient force. A control may be included to compare the hold-down force as measured by the sensor with a predetermined or programmed hold-down force. The control may then alter or adjust the hold-down force provided by the hold-down device by controlling the motor torque or the pneumatic pressure. Measuring devices may also be provided for measuring the motor torque or pneumatic pressure, thereby facilitating measurement or determination of the hold-down force of the hold-down device by calculating the force generated by the motor or pneumatic device.

Typically, the grabber will be disposed on a handling device, robot etc. To this end, the grabber may use the support frame to facilitate attachment to a load lifting device, such as a robot or robotic palletizer.

The grabber may increase the holding forces acting upon the packing units using vacuum suction heads, pneumatic units or the like.

These and other objects, advantages, purposes and features of the present invention will become apparent upon review of the following specification in conjunction with the drawings.

DESCRIPTION OF THE PREFERRED EMBODIMENT

Figure 1:
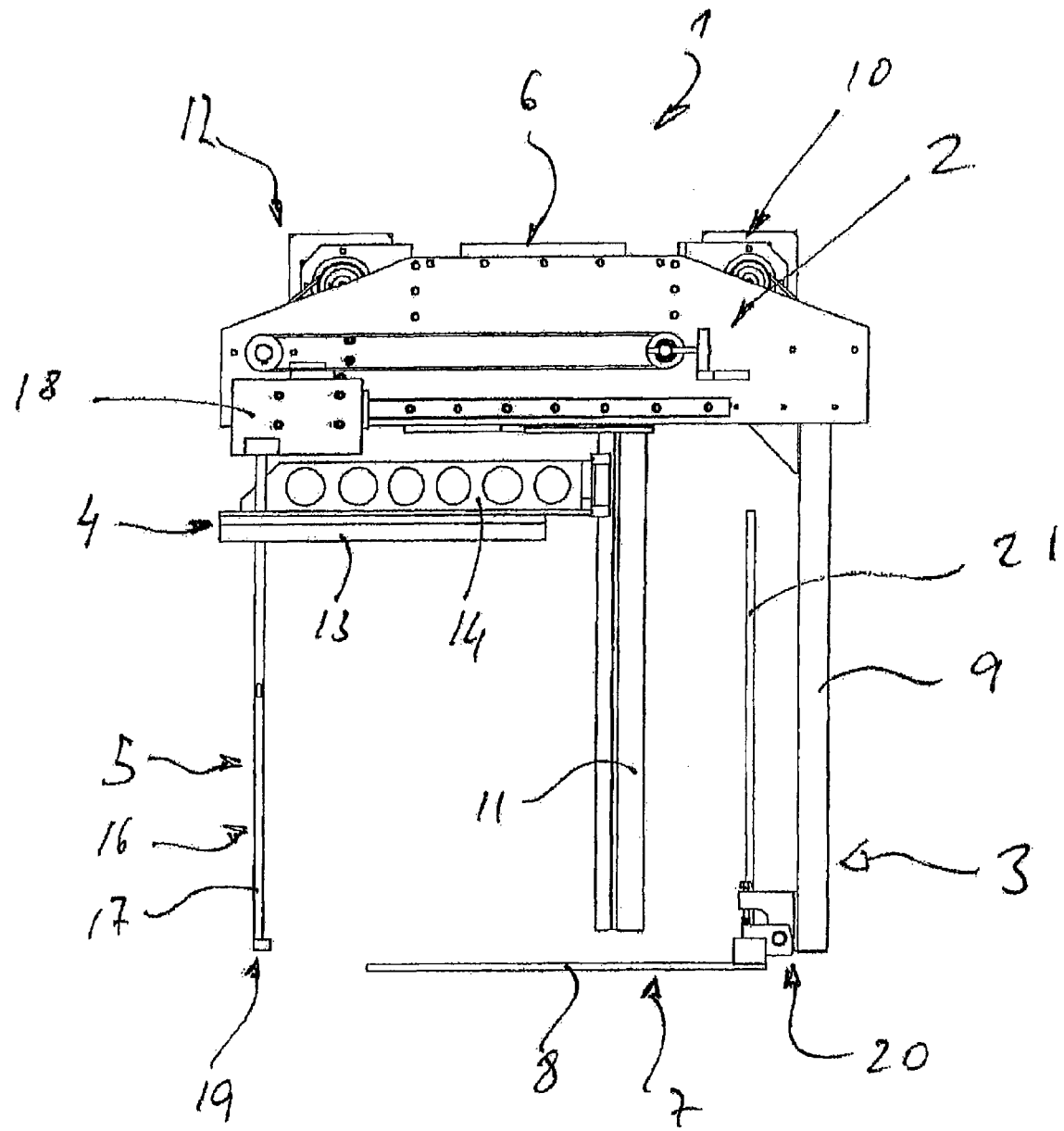
FIG. 1 is a side elevation of a grabber in accordance with the an aspect of the invention.

The Figures illustrate a grabber, which is designated in its entirety by the reference numeral 1, for automatically grabbing and putting down or lowering or placing packing units or load carriers or parcels or boxes or objects of different dimensions and configurations, such as for loading or stacking pallets or rolling trucks with varied packing units or pieces as disclosed in International Application Ser. No. PCT/EP2008/053008 filed Apr. 7, 2007 and U.S. patent application Ser. No. 12/294,495 filed concurrently herewith by Roland Fritzsche for a PROCESS AND DEVICE FOR MULTI-LAYER STACKING ON A SUPPORT the disclosures of which are hereby incorporated herein by reference in their entireties.

Figure 2:
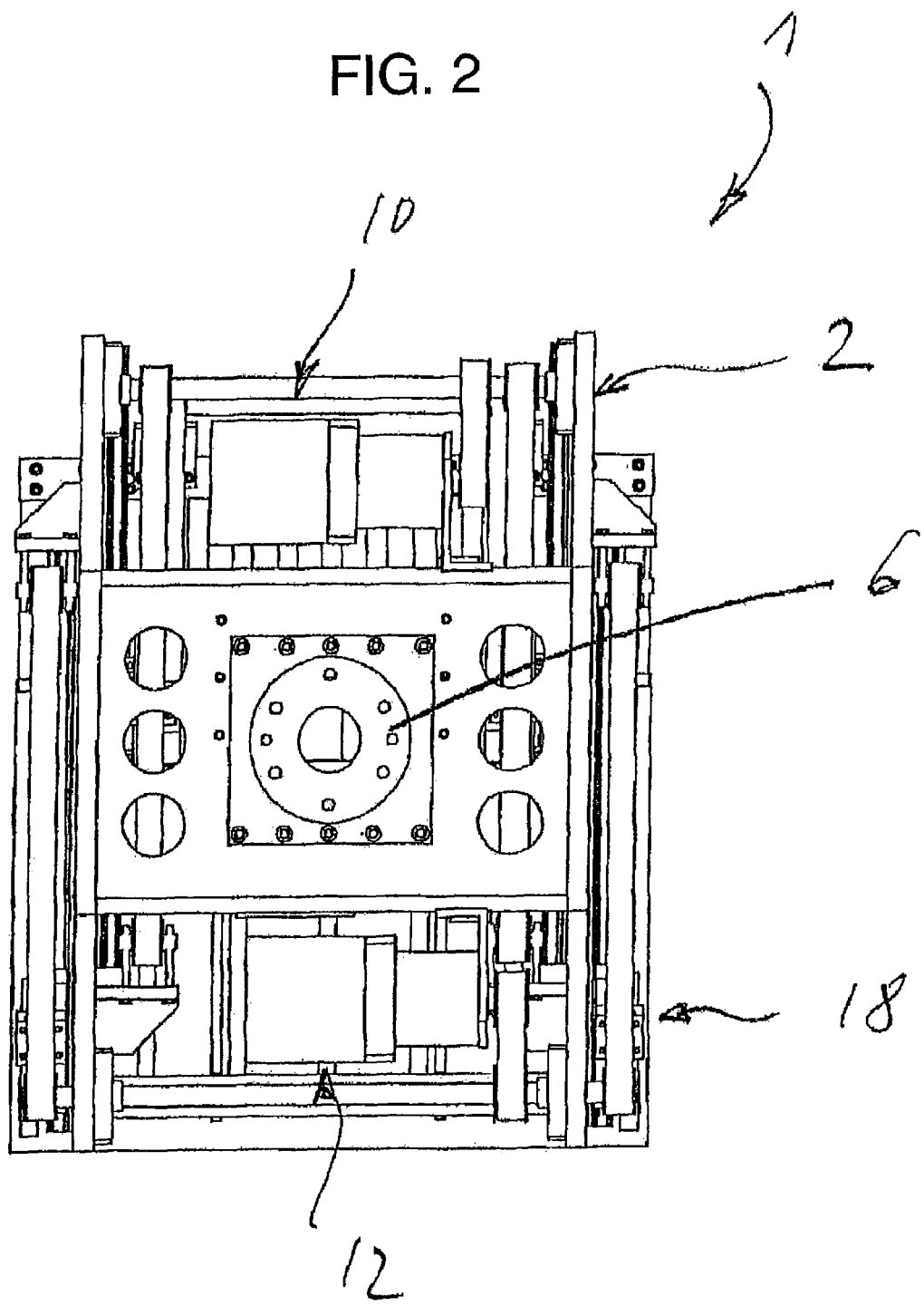
FIG. 2 is a top plan view of the grabber of FIG. 1.
Figure 3:
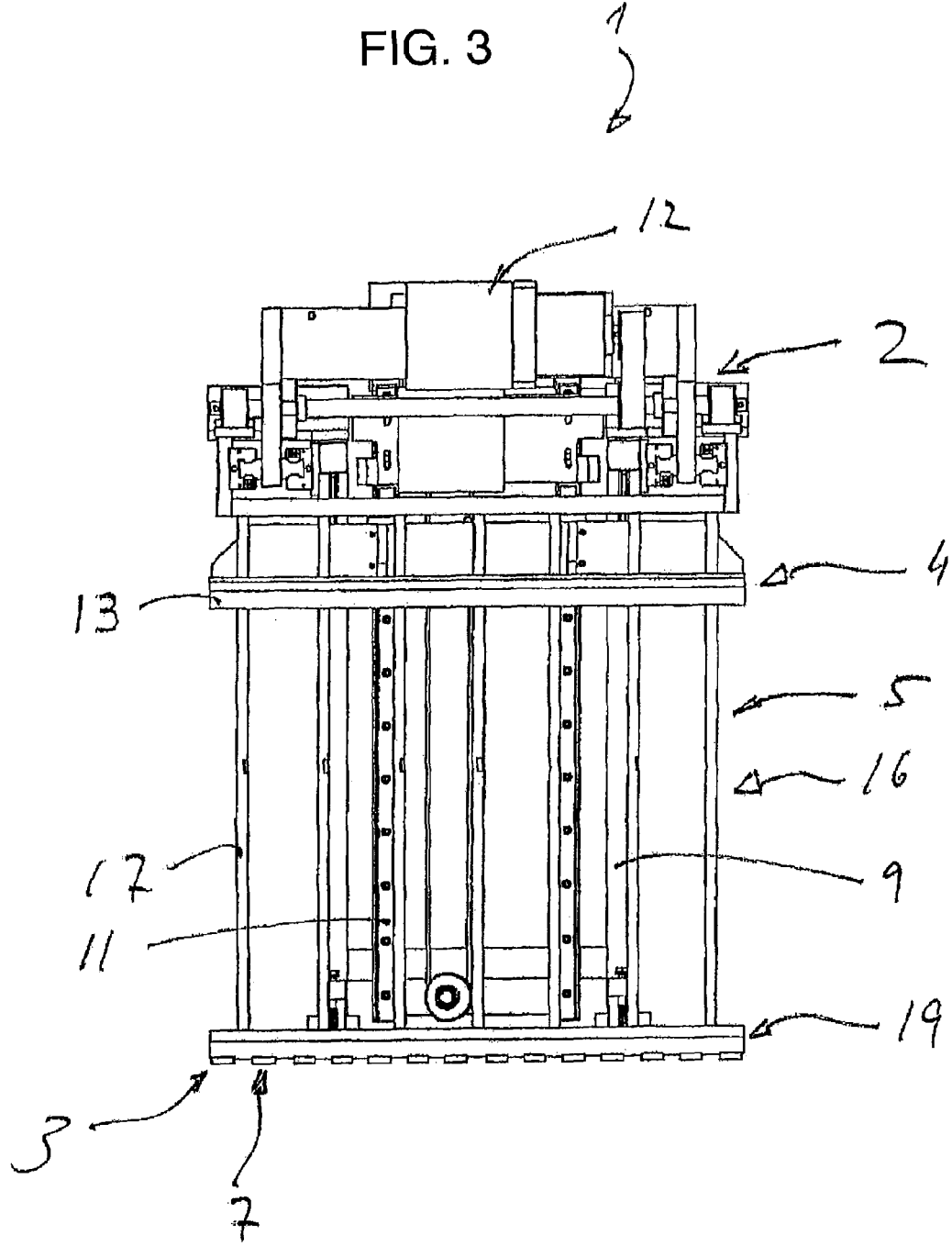
FIG. 3 is a front elevation of the grabber of FIG. 1.

In the illustrated embodiment, the grabber 1 includes a support frame 2, to which a support 3, a hold-down device 4 and a stripper 5 are attached. A connection plate 6 (see FIG. 2) is provided for optional attachment of the grabber to a robot arm or other robotic palletizer, not illustrated, via support frame 2. Power is also typically supplied to the grabber 1 by the robot.

The support 3 includes a support comb 7 having several spaced apart flat tines 8. The support comb 7 is attached to the support frame 2 via a support arm 9 which extends generally vertically downwards from the support frame. The support arm 9, and thus also the support comb 7, are operable to displace horizontally with respect to the support frame 2 via an electric motor-driven belt drive 10, such as to release the packing unit or piece by retracting the support comb 7. The Figures show the support 3 in a generally central position.

The hold-down device 4 is attached to a support arm 11 which extends generally vertically downwards from the support frame 2, and the support arm 11 is generally stationary. The hold-down device 4 is operable to move as a carriage on or over or along the support arm 11 via a further electric motor-driven belt drive (not visible beneath the plate 6), vertically toward the support comb 7. Thus the distance between the hold-down device 4 and the support 3 or the support comb 7 can be changed and the object or packing unit or piece can be pressed or clamped against the support comb 7 by a mechanically generated clamping force generated by the downward urging of the hold-down device. The Figures show the hold-down device 4 in its uppermost position.

Figure 4:
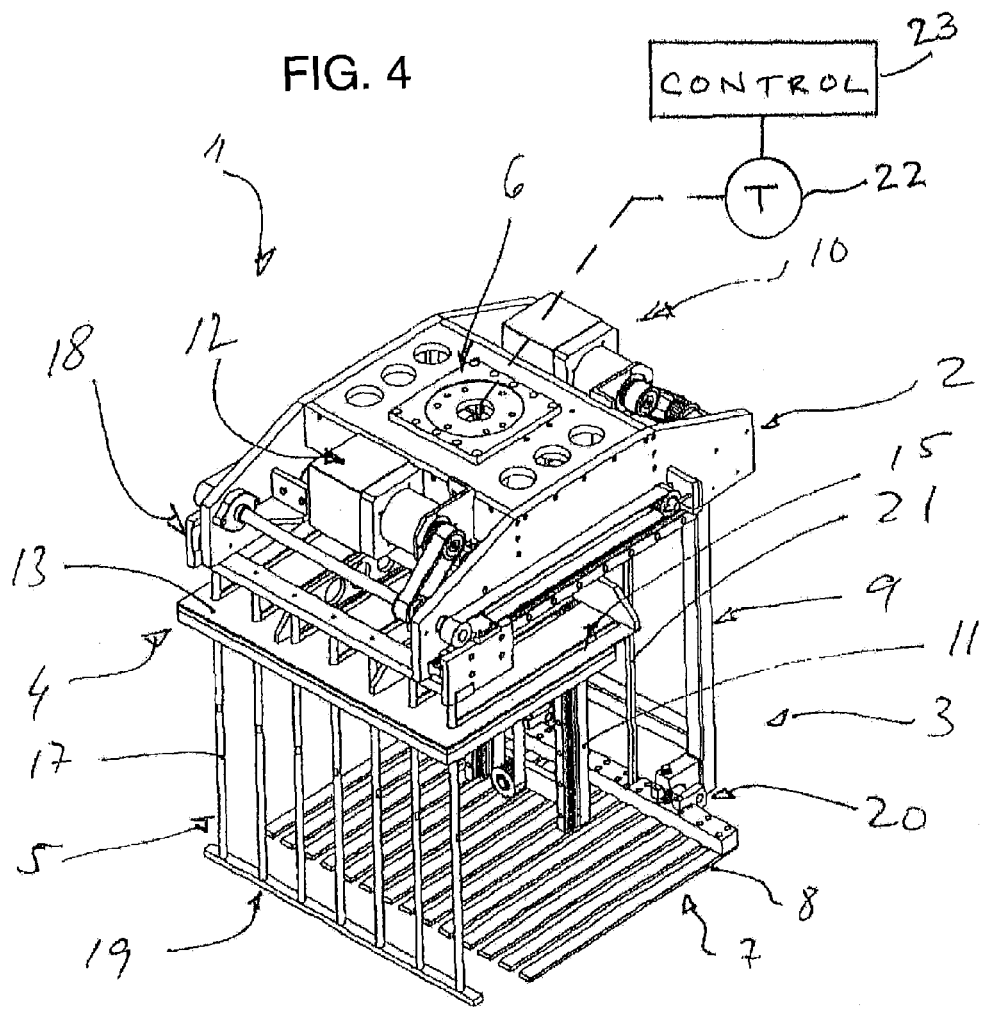
FIG. 4 is a perspective view of the grabber of FIG. 1.

The hold-down device 4 may be formed with a plate-shaped pressure element 13 which is attached via a corresponding holding component 14 to the support arm 11 and acts upon the corresponding packing unit or piece. The base surface of the plate-shaped pressure element 13 extends over the corresponding portions of the support comb 7. The hold-down device 4 may also be provided with slot-like cut-outs 15 (see FIG. 4) in the plate-shaped pressure element 13 to allow the stripper 5 to pass through the hold-down device 4.

The stripper 5 is disposed above the support comb 7 and/or the tines 8, so that as the support 3 is retracted the packing unit lies against the stripper 5 and is thus fixed or substantially immobilized. In the illustrated embodiment as shown in the Figures, the stripper 5 is shown in its foremost position and can be moved or positioned by a belt drive 12.

The hold-down force of the hold-down device may be determined by a sensor or measuring device such as a torque transducer 22 that measures or monitors the torque produced by the electric motor or the like. Alternatively, such as in the case of a hold-down device powered by a pneumatic device such as a pneumatic motor or pneumatic cylinder, the hold-down force may be measured by a measuring device that measures the pressure supplied to the pneumatic device. A control 23 may also be provided to compare the hold-down force as determined by the sensor or measuring device with a programmed or predetermined hold-down force. The control may adjust the hold-down device, such as by adjusting the power supplied to a motor or the air pressure supplied to a pneumatic device, to clamp the respective packing with the predetermined hold-down force.

In order to retain the packing piece, a plurality of strippers 5 may include a horizontal wall or barrier 16 made up of rod-like structures (see FIG. 1). The rods 17 of the barrier 16 pass through the slots 15 of the hold-down device 4 and each issue from a carriage 18. The carriage is movable by the belt drive 12 on or along a linear guide on the support frame 2, thereby allowing the stripper 5 to be displaced generally horizontally and to be movable in parallel with the support 3. Therefore, the barrier 16 can be positioned according to the dimensions of the packing unit or piece. The rods 17 may be connected to a transverse piece 19 on the sides of rods 17 facing the support comb, thereby stiffening the strippers 5.

In the illustrated embodiment, the support comb is attached to the support arm 9 via a pretensioned articulated joint 20 so that, during operation of the support comb, the support comb is able to yield if necessary during stacking in order to protect the grabber 1. If the support comb 7 is moved or operated or driven too forcefully, a release rod 21 extending generally perpendicularly from the articulated joint 20 upwards in parallel with the support arm 9 strikes against a corresponding sensor to affect an emergency stop.

Changes and modifications to the specifically described embodiments may be carried out without departing from the principles of the present invention, which is intended to be limited only by the scope of the appended claims, as interpreted according to the principles of patent law including the doctrine of equivalents.

The invention claimed is:

1. A grabber for automatically grabbing and placing packing units of different dimensions and configurations, comprising:

a frame, and a support attached to said frame at an end portion of said support, wherein the support is horizontally movable with respect to the frame and having another end portion opposite said end portion;

a hold-down device and a stripper, wherein the hold-down device is vertically movable in the direction of the support, wherein a packing unit can be pressed against the support by mechanical clamping, and the stripper is arranged above the support, so the packing unit lies against the stripper unit and is thereby immobilized when the support is retracted to release the packing unit;

wherein the stripper can move horizontally parallel to the support to a position to immobilize a packing unit positioned at said another end portion when the support is retracted to release the packing unit, the hold-down device is configured as a plate that extends across substantially the entire surface of the supports, wherein the stripper comprises a plurality of rods that define a generally vertical wall and the hold-down device is provided with cut-outs for the passage of the rods of the stripper.

2. A grabber according to claim 1, wherein the support is designed as a support plate or support comb with several spaced-apart tines.

3. A grabber according to claim 2, wherein the interval spacing between the spaced apart tines of the support is variable by adjusting relative positions of the tines.

4. A grabber according to claim 3, wherein the hold-down device has an elastic pad on a side facing the support.

5. A grabber according to claim 2, wherein the hold-down device has an elastic pad on a side facing the support.

6. A grabber according to claim 1, wherein the hold-down device is provided with oblong cutouts.

7. A grabber according to claim 6, wherein the interval spacing between the spaced apart tines of the support is variable by adjusting relative positions of the tines.

8. A grabber according to claim 7, wherein the hold-down device has an elastic pad on a side facing the support.

9. A grabber according to claim 6, wherein the hold-down device has an elastic pad on a side facing the support.

10. A grabber according to claim 1, wherein the interval spacing between the spaced apart tines of the support is variable by adjusting relative positions of the tines.

11. A grabber according to claim 10, wherein the hold-down device has an elastic pad on a side facing the support.

12. A grabber according to claim 1, wherein the hold-down device has an elastic pad on a side facing the support.

13. A grabber according to claim 1, wherein the support, the hold-down device and the stripper are designed to travel by means of an electric motor or a pneumatic drive unit.

14. A grabber according to claim 1 including at least one sensor for determining the hold-down force between the support and the hold-down device.

15. A grabber according to claim 1, wherein the holding force of the hold-down device is determined by measuring or adjusting the pressure for a pneumatic drive or the torque for an electric drive.

16. A grabber according to claim 1, wherein said frame is adapted to be fastened to a robot or overhead gantry robot.

17. A grabber according to claim 1, wherein the holding forces acting on the packing units are amplified by vacuum heads or pneumatic units.

18. A grabber for automatically grabbing and placing packing units of different dimensions and configurations, comprising:

a frame, and a support attached to said frame, wherein the support is horizontally movable with respect to the frame;

a hold-down device and a stripper, wherein the hold-down device is vertically movable in the direction of the support, wherein a packing unit can be pressed against the support by mechanical clamping, and the stripper is arranged above the support, so the packing unit is immobilized when the support is retracted;

wherein the stripper can move horizontally parallel to the support, the hold-down device is configured as a plate that extends across substantially the entire surface of the supports, wherein the stripper comprises a plurality of rods that define a generally vertical wall and the hold-down device is provided with cut-outs for the passage of the rods of the stripper, wherein the support is designed as a support plate or support comb with several spaced-apart tines and wherein the hold-down device is provided with oblong cut-outs.

19. A grabber according to claim 18, wherein the interval spacing between the spaced apart tines of the support is variable by adjusting relative positions of the tines.

20. A grabber according to claim 19, wherein the hold-down device has an elastic pad on a side facing the support.

21. A grabber according to claim 18, wherein the hold-down device has an elastic pad on a side facing the support.

* * * * *

UNITED STATES PATENT AND TRADEMARK OFFICE
CERTIFICATE OF CORRECTION

| | | |
|---|---|---|
| PATENT NO. | : 7,938,614 B2 | Page 1 of 1 |
| APPLICATION NO. | : 12/237780 | |
| DATED | : May 10, 2011 | |
| INVENTOR(S) | : Roland Fritzsche | |

It is certified that error appears in the above-identified patent and that said Letters Patent is hereby corrected as shown below:

Column 6:
Line 13, Claim 1, "supports" should be --support--.

Column 6:
Line 56, Claim 17, "forces" should be --force--.
Line 56, Claim 17, "are" should be --is--.

Column 7:
Line 6, Claim 18, "supports" should be --support--.

Signed and Sealed this
Fourth Day of October, 2011

David J. Kappos
*Director of the United States Patent and Trademark Office*